United States Patent Office 3,513,131
Patented May 19, 1970

3,513,131
POLYMETHANES PREPARED FROM N,N'-BIS-(HYDROXYORGANO) PYROMELLIMIDES
Gilbert Joseph Marin and Andre Louis Armand Rio, Lyon, France, assignors to Rhone-Poulenc S.A., Paris, France, a French body corporate
No Drawing. Filed June 15, 1966, Ser. No. 557,635
Claims priority, application France, June 21, 1965, 21,613
Int. Cl. C08g 22/16
U.S. Cl. 260—75          8 Claims

ABSTRACT OF THE DISCLOSURE

The invention provides novel polyurethane elastomers prepared by reacting a diol of molecular weight 500 to 5000 with a diisocyanate and an N,N'-bis(hydroxyorgano)pyromellimide.

---

This invention relates to polyurethane elastomers and their preparation.

The invention provides polyurethane elastomers comprising diol residues of the formula:

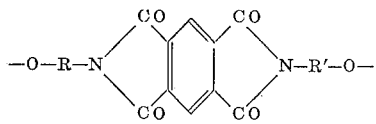
(I)

in which R and R', which may be the same or different, are each divalent aliphatic, cycloaliphatic, arylaliphatic or cycloaliphatic-aliphatic radicals, linked to each other or to other diol residues or both, via residues of the formula:

$$—CO—NH—T—NH—CO—ewline$$ (II)

in which T is a divalent aliphatic, cycloaliphatic or aromatic radical.

More specifically, the invention provides the polyurethane elastomers which comprise residues of Formula I and residues of the formula:

$$—O—Z—O—ewline$$ (III)

or both residues of Formula I and residues of formula $$—O—R''—O—ewline$$ (IV)

linked via residues of Formula II, Z being such that the compound HO—Z—OH is a hydroxy-terminated polyester or polyether, and R'' being such that the compound HO—R''—OH is an aliphatic or cycloaliphatic diol.

According to a feature of the invention, the aforesaid elastomers are made by reacting a diol of the formula:

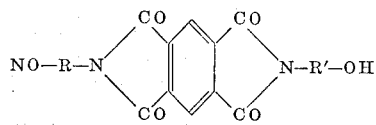
(V)

in admixture with another diol, with a diisocyanate of the formula:

$$OCN—T—NCOewline$$ (VI)

where R, R' and T are as hereinbefore defined. More particularly, a diol of the formula:

$$HO—Z—OHewline$$ (VII)

or a mixture of a such diol with a diol of formula $$HO—R''—OHewline$$ (VIII)

and a diol of Formula V are reacted with a diisocyanate of Formula VI, Z and R'' being as hereinbefore defined. It will, of course, be understood that the amounts of the reagents are chosen so that there is substantially one hydroxyl group for each isocyanate group.

The polyester or polyether of Formula VII may be any α,ω-dihydroxy linear polyester or polyether of molecular weight 500 to 5000 known for use in making polyurethane elastomers. Suitable polyesters are obtained by polycondensation of an aliphatic, cycloaliphatic or aromatic carboxylic diacid, especially an alkylene dicarboxylic acid (e.g. of 4 to 6 carbon atoms), a cycloalkylene dicarboxylic acid (e.g. of 7 to 8 carbon atoms), or a phenylene dicarboxylic acid, e.g. adipic, succinic, cyclohexane-1,4-dicarboxylic, o-phthalic, isophthalic or terephthalic acid, or a mixture of such diacids, with an aliphatic or cyclic diol, especially an alkylene, polyalkylene or cycloalkylene glycol (the alkylene groups preferably containing 2 to 6 and the cycloalkylene groups 5 or 6 carbon atoms) or a mixture of such diols, the polycondensation being carried out in a manner such as to produce a polyester whose acid number is practically zero. Suitable diols include ethylene glycol, diethylene glycol, triethylene glycol, propylene glycol, tetramethylene glycol, a polytetramethylene glycol, 1,6-hexanediol, 1,4-cyclohexaneidiol, and bis(1,4-hydroxymethyl)cyclohexane.

Suitable polyethers of Formula VII are, for example, compounds resulting from the polyaddition or copolyaddition of alkylene oxides, especially of 2 to 4 carbon atoms, such as ethylene oxide, propylene oxide or tetrahydrofurane, optionally together with glycols, especially ethylene glycols of 2 to 4 carbon atoms, such as ethylene glycol or propylene glycol, or from the polycondensation of one or more such glycols.

The diisocyanate of Formula VI may be any aliphatic, cycloaliphatic or aromatic diisocyanate which has previously been used in making polyurethane elastomers. Especially suitable diisocyanates are hexane-1,6-diisocyanate, dicyclohexylmethane - 4,4' - diisocyanate, the isomeric tolylene diisocyanates, and diphenylmethane-4,4'-diisocyanate. It is also possible to use diisocyanates containing functional groups such as ditolylurea-p,p'-diisocyanate.

The diols of Formula V are prepared by the method described by HOPPF (Bull. Soc. Chim. Fr. 1958 1283) for the preparation of N,N'-bis(2-hydroxyethyl)pyromellimide, namely by reaction of pyromellitic anhydride with an amino-alcohol or a mixture of amino-alcohols. The amino-alcohol may be any aliphatic, cycloaliphatic or araliphatic amino-alcohol of formula $$HO—R(or R')—NH_2$$

Preferably a single amino-alcohol is used (i.e. R=R'), such that the group R is alkylene of 2 to 6 carbon atoms or cyclohexylene. Suitable amino-alcohols are 2-aminoethanol, 2-aminopropan-1-ol, 3 - aminopropan - 1-ol, 4-aminobutan-1-ol, 5-aminopentan - 1 - ol, 2 - aminocyclopentanol, 2-aminocyclohexanol, 4-aminocyclohexanol, 2-aminocycloheptanol, and p-aminobenzyl alcohol. These amino-alcohols may be substituted by atoms or groups which are inert under the reaction conditions, for example halogen atoms or hydrocarbon radicals. Thus in preparing diols of Formula V, it is possible to use amino-alcohol starting materials such as 2-amino-3-chloropropanol and 2-amino-5-methylcyclohexanol. Preferred diols of Formula V are N,N'-bis(2-hydroxyethyl)pyromellimide, N,N'-bis(2 - hydroxypropyl)pyromellimide and N,N'-bis(4-hydroxycyclohexyl)pyromellimide.

The diol of Formula VIII may be any diol suitable for use in the preparation of the polyesters of Formula VII especially ethylene glycol, propylene glycol, diethylene glycol, butane - 1,4 - diol or hexane-1,6-diol. The simultaneous use of diols of Formulae V and VIII makes it possible to vary the properties of the polyurethane elastomers over a wide range.

To prepare the polyurethanes of the invention, an excess of the diisocyanate may be heated in an inert atmosphere, undiluted or in solution with the dihydroxy polyester of polyether of Formula VII and the diisocyanate-terminated prepolymer so obtained may then be treated with the diol of Formula V or with a mixture of this diol and a diol of Formula VIII.

However it is preferred simply to heat together a mixture of all the starting materials to 60° C. to 180° C., in an inert atmosphere with vigorous stirring, the temperature being gradually raised.

The polymer so obtained may at the end of the reaction be directly used for casting or spinning processes in the molten state. It may also, after cooling and granulation, be dissolved in an organic solvent (e.g. dimethylsulphoxide or a cresol) and then processed by the usual methods of casting or spinning. The new polyurethanes may be converted by spinning, extrusion or injection into filaments, films, profiles or other moulded articles, (e.g. tubes); or they may also be used in adhesive compositions. The filaments and films obtained from the new elastomers have good stability to light and heat.

The following examples illustrate the invention.

EXAMPLE 1

A 250 cm.³ flask fitted with a stirrer and a nitrogen supply tube is charged with 18.24 g. of N,N'-bis(2-hydroxyethyl)pyromellimide (M.P. 282° C.), 52.62 g. of poly(ethylene glycol adipate) of molecular weight 1754, and 15.12 g. of hexane-1,6-diisocyanate. The apparatus is purged with nitrogen, and then heated at a temperature rise of 1° C./min. to 170° C., and the temperature is maintained at this value for one hour. At the end of the reaction, a homogeneous mass having a softening range from 170° C. to 210° C. is obtained. It is spun at 190° C. to give an elastic filament.

EXAMPLE 2

12.16 g. of N,N'-bis(2-hydroxyethyl)pyromellimide, 48.4 g. of poly(ethylene glycol adipate) of hydroxyl number 0.124 and molecular weight 1613, 7.2 g. of butane-1,4-diol, and 25.2 g. of hexane-1,6-diisocyanate are charged into a flask identical with that of Example 1. The reactor is purged with nitrogen and then heated with stirring at a rate of 1° C. per minute. The temperature is maintained for one hour successively at 80°, 120°, 150° and 160° C. At the end of the reaction, a homogeneous mass having a softening temperature from 165° C. to 185° C. is obtained.

By spinning the molten product at 185° C. and 80 bars at a speed of 9.5 m./min., a 200-denier filament is produced having a tensile strength of 0.28 g./denier and an elongation at breaks of 655%.

EXAMPLE 3

12.16 g. of N,N'-bis(2-hydroxyethyl)pyromellimide, 50 g. of polytetrahydrofuran with terminal hydroxyl groups and a molecular weight of 1000, 7.2 g. of butane-1,4-diol and 28.56 g. of hexane-1,6-diisocyanate are reacted by the procedure of Example 2. A product having a softening range of 160° C. to 175° C. is obtained.

This product is spun at 160° C. and a 728-denier filament having a tensile strength of 0.262 g./denier and an elongation at break of 750% is obtained.

EXAMPLE 4

13.28 g. of N,N'-bis(2-hydroxypropyl)pyromellimide (M.P. 235° C.), 52.62 g. of poly(ethylene glycol adipate) of molecular weight 1754 and hydroxyl number 0.114, 7.2 g. of butane-1,4-diol and 25.2 g. of hexane-1,6-diisocyanate are reacted as in Example 2. A product having a softening range of from 180 to 200° C. is obtained. By spinning the product at 183° C. a 500-denier filament having a tensile strength of 0.209 g./denier and an elongation at break of 625% is obtained.

EXAMPLE 5

Working as in Example 1, 16.48 g. of N,N'-bis(4-hydroxycyclohexyl)pyromellimide (M.P. 330° C.), 52.62 g. of poly(ethylene glycol adipate) of molecular weight 1754, 7.2 g. of butane-1,4-diol and 25.2 g. of hexane-1,6-diisocyanate are reacted together. A product having a softening range of from 200 to 240° C. is obtained. On spinning at 205° C., a 544-denier filament is obtained having a tensile strength of 0.232 g./denier and an elongation at break of 600%.

EXAMPLE 6

Working as in Example 1, 12.6 g. of N,N'-bis(2-hydroxyethyl)pyromellimide, 35.08 g. of poly(ethylene glycol adipate) of molecular weight 1754, 3.6 g. of butane-1,4-diol, and 17.4 g. of toluene diisocyanate are reacted together. A product having a softening range of from 145 to 165° C. is obtained. By spinning this at 147° C. a 767-denier filament having a tensile strength of 0.26 g./denier and an elongation at break of 689% is obtained.

We claim:
1. A polyurethane elastomer prepared by reacting (A) a dihydroxy containing material having a molecular weight between 500 and 5000 (B) an organic diisocyanate having the general formula:

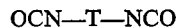

wherein T is a divalent radical selected from the group consisting of aliphatic, cycloaliphatic, and aromatic, and (C) a diol having the formula:

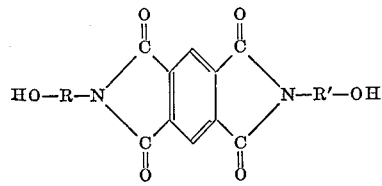

wherein R and R' may be the same or different and are divalent radicals selected from the group consisting of aliphatic, cycloaliphatic, arylaliphatic, and cycloaliphatic-aliphatic.

2. The polyurethane of claim 1 wherein, in addition to components (A), (B), and (C), a compound (D), having the formula

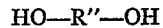

wherein R" is a divalent radical selected from the group consisting of aliphatic or cycloaliphatic is included in the reaction.

3. The polyurethane of claim 1 wherein said dihydroxy containing material is a polyester.

4. The polyurethane of claim 1 wherein said dihydroxy containing material is a polyether.

5. The polyurethane of claim 1 wherein said diol is N,N'-bis(2-hydroxyethyl)pyromellimide.

6. The polyurethane of claim 2 wherein said diol is N,N'-bis(2-hydroxyethyl)pyromellimide.

7. The polyurethane of claim 6 wherein said compound is 1,4-butanediol.

8. The polyurethane of claim 1 wherein T is selected from the group consisting of hexamethylene, 4,4'-dicyclohexylmethane, tolylene, and 4,4'-diphenyl-methane.

References Cited

FOREIGN PATENTS 1,229,287 11/1966 Germany.
1,450,606 7/1966 France.

DONALD E. CZAJA, Primary Examiner

M. J. WELSH, Assistant Examiner

U.S. Cl. X.R.

260—30.8, 33.4, 77.5